United States Patent [19]

Yokokawa et al.

[11] 4,237,407
[45] Dec. 2, 1980

[54] VERTICAL DEFLECTION CIRCUIT FOR A CAMERA TUBE IN A TELEVISION CAMERA

[75] Inventors: Sumio Yokokawa, Yokohama; Yasuaki Watanabe, Kasukabe, both of Japan

[73] Assignee: Victor Company of Japan, Limited, Yokohama, Japan

[21] Appl. No.: 4,599

[22] Filed: Jan. 18, 1979

[30] Foreign Application Priority Data

Jan. 20, 1978 [JP] Japan .................................. 53-4849

[51] Int. Cl.³ ........................ H01J 29/70; H01J 29/72
[52] U.S. Cl. ...................................... 315/389; 358/221
[58] Field of Search ........................ 358/221; 315/389

[56] References Cited

U.S. PATENT DOCUMENTS

| | | | |
|---|---|---|---|
| 3,558,809 | 1/1971 | Aoki | 358/221 X |
| 3,725,727 | 4/1973 | Waehner | 315/389 |
| 3,737,571 | 6/1973 | Gaebele et al. | 358/221 |

*Primary Examiner*—Theodore M. Blum
*Attorney, Agent, or Firm*—Haseltine, Lake & Waters

[57] ABSTRACT

A vertical deflection circuit is used in a camera tube in a color television camera in which the camera tube is provided with an optical filter having an optically black part extending in parallel with a beam scanning direction of the camera tube. A vertical deflection circuit comprises a circuit for generating a saw-tooth voltage for vertical deflection, a vertical deflection coil for the camera tube, and a circuit for supplying the saw-tooth voltage thus generated to one end of the vertical deflection coil in DC coupling. Due to temperature fluctuation, a vertical deflection width fluctuates with respect to a position corresponding to a black part of the filter, as a reference.

2 Claims, 5 Drawing Figures

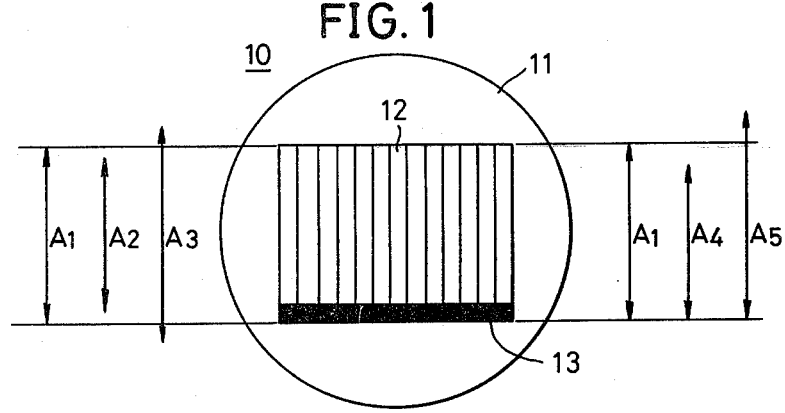
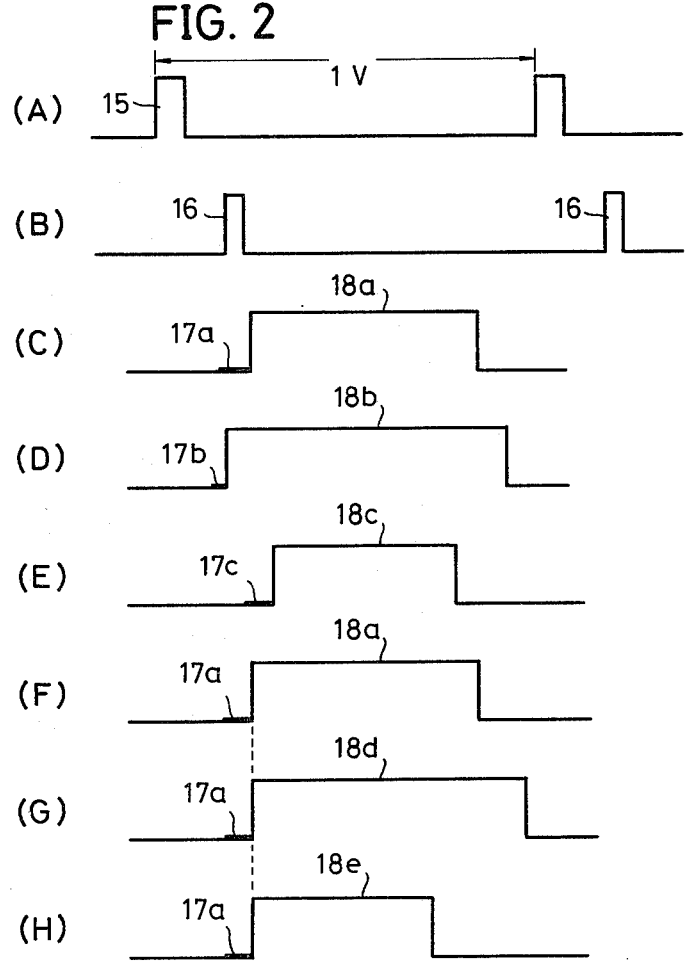

VERTICAL DEFLECTION CIRCUIT FOR A CAMERA TUBE IN A TELEVISION CAMERA

BACKGROUND OF THE INVENTION

The present invention relates generally to vertical deflection circuits for camera tubes in television cameras, and more particularly to a circuit for carrying out vertical deflection so as to carry out DC restoration of black level of a video signal irrespective of amplitude fluctuations of a vertical deflection voltage.

In general, a dark current exists in the camera tube of a color television camera. This dark current is not continually constant but fluctuates or becomes irregular due to temperature variation. When there is a fluctuation in this dark current, the white balance is destroyed. Particularly in a frequency separation system in which an optical stripe filter is used, the green color signal transmitted at low frequency is directly influenced by the dark current.

Heretofore, in color television cameras of the single-tube or two-tube type of a color multiplex system in which vidicon camera tubes are used as camera tubes for chrominance signals, optical filters provided with optically black parts vertically at the end portions in the horizontal scanning direction of the effective picture have been used. A video signal obtained from a camera tube by using an optical filter of this character has a black level portion produced by the optically black part in the trailing edge of the horizontal beam blanking of each horizontal scanning period. Heretofore, correction for black level fluctuation due to dark current fluctuation has been carried out by clamping this black level portion, whereby the DC restoration has been carried out.

However, when there is a flaw or damage in the optically black part of the optical filter, or when there is a flaw in the photoconductive film or nesa film of the camera tube corresponding to this black part, a signal of high level in pulse form is generated in the signal part corresponding to the optically black part in the image pickup signal. In the above mentioned known system, however, when the unwanted pulse signal due to a flaw is generated, clamping occurs with this unwanted signal as a reference, and accurate black level clamping cannot be carried out. Furthermore, the dark current level, in general, is not uniform over the entire photoconductive surface of the camera tube in the horizontal scanning direction but is higher at the two end parts than the central part. (This level distribution will hereinafter be referred to as "dark current shading".) By the above mentioned known system, the effect of this dark current shading could not be reduced.

Another example of a color television camera is that wherein use is made of an optical filter comprising a color stripe filter provided on the upper or lower portion thereof laterally with an optically black part. In this color television camera, the DC restoration is generally carried out by clamping a black level output signal part in the output signal of the camera tube by a clamping pulse.

When there exists a variation in environmental temperature, the amplitude of the saw-tooth voltage to be applied to a vertical deflection coil undergoes change, whereby the vertical deflection width thus changes.

A vertical deflection circuit known heretofore has been arranged so that a saw-tooth voltage for vertical deflection is supplied by way of a capacitor to a vertical deflection coil. In this known circuit, the average level of the saw-tooth voltage is adapted to correspond to the center of vertical deflection in the camera tube, and deflection is carried out upward and downward with respect to the above described center. Accordingly, as will be described in conjunction with drawings hereinafter, when the amplitude of the saw-tooth voltage fluctuates due to causes such a temperature fluctuation, there occurs fluctuation in a position of the black level output signal part corresponding to the black part of the optical filter, among the output signal of the camera tube.

The clamping pulse generated from an electrical circuitry for clamping the output black level signal for DC restoration has a timing for clamping the black level in a case where the saw-tooth voltage has a normal amplitude thereby carrying out vertical deflection normally, and accordingly the output black level signal is positioned at the normal position. Heretofore, position of the output black level signal undergoes fluctuation due to causes such a temperature fluctuation, as described above. For this reason, there give rise to difficulties that clamping cannot be carried out appropriately, which results in improper DC restoration of black level.

For getting rid of the above described effect of dark current shading and for causing the black level signal not to appear in the final video signal, it is required to narrow the width of black part of the optical filter, thus shortening a period of time when the output black level signal exists. However, this arrangement involves difficulty that the accurate DC restoration of the black level cannot carried out under even slightest position fluctuation, because the period of time when the output black level signal exists becomes short.

Accordingly, a manner for correcting electrically the amplitude of the saw-tooth voltage so that it does not fluctuates irrespective of temperature fluctuation may be conceivable. However, a circuit arrangement according to this manner will be extremely complex, whereby the television camera becomes expensive and bulky. Thus, the above manner is not suitable for potable type television cameras which are preferred to be inexpensive and of small size.

SUMMARY OF THE INVENTION

Accordingly, it is a general object of the present invention to provide a novel and useful vertical deflection circuit for a camera tube in a television camera in which the above described difficulties encountered in the prior art have been overcome.

Another and specific object of the invention is to provide a vertical deflection circuit for a camera tube in a television camera which is adapted to supply saw-tooth voltage from a saw-tooth voltage generation circuit to a vertical deflection coil in DC coupling, without passing through a capacitor. According to the circuit of the present invention, vertical deflection is carried out with respect to, as a reference, the black part of the optical filter. In this connection, even if the vertical deflection width fluctuates due to the temperature fluctuation, the output black level signal derived in correspondance with the black part of the optical filter among the output signal of the camera tube will be always located at an appropriate position. Accordingly, the DC restoration of the black level part can be always accurately and positively accomplished.

Other objects and further features of the invention will be apparent from the following detailed description when read in conjunction with the accompanying drawings.

BRIEF DESCRIPTION OF THE DRAWINGS

In the drawings:

FIG. 1 is a front view of an optical filter suitable for use in a color television camera in which the vertical deflection circuit according to the present invention can be applied;

FIG. 2(A) through FIG. 2(H) are graphical diagrams respectively indicating the waveform of video signals produced outputs by a camera tube of a color television camera;

DETAILED DESCRIPTION

Figure 3:
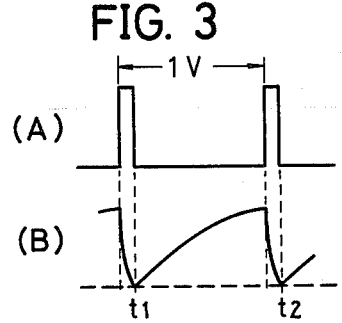
FIG. 3(A) and FIG. 3(B) are waveforms respectively indicating a vertical driving pulse and a saw-tooth voltage for vertical deflection.

One example of an optical filter used in a color television camera in which the vertical deflection circuit according to the present invention can be used is shown in FIG. 1. This optical filter 10 comprises a glass plate 11 provided thereon with an optical color stripe filter 12 for color multiplexing and an optically black part 13 extending laterally. Light from an object to be image-picked up is passed through this optical filter and projected onto the photoconductive surface of a camera tube. As a result of beam scanning of this photoconductive surface by the camera tube, a camera tube output signal (video signal) as indicated in FIG. 2(C) through FIG. 2 (H) is led out through the signal electrodes of the camera tube. In FIG. 2(A), the interval 1V indicates one vertical scanning period between vertical beam blankings 15 and 15.

Figure 4:
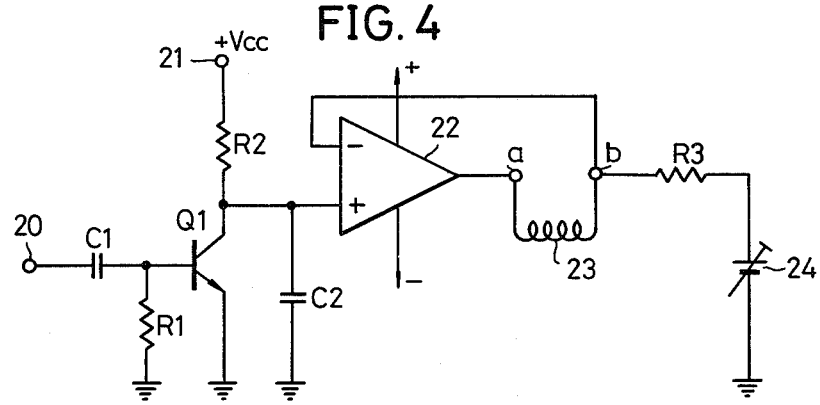
FIG. 4 is a circuit diagram showing one embodiment of a vertical deflection circuit according to the present invention.

One embodiment of a vertical deflection circuit according to the present invention is shown in FIG. 4. A vertical driving pulse indicated in FIG. 3(A) is supplied to an input terminal 20, and is then applied through a capacitor C1 to the base of an NPN transistor Q1. The transistor Q1 has an emitter which is grounded and a collector which is connected to a terminal 22 of the power source +Vcc through a resistor R2. A resistor R1 is connected between the base of the transistor Q1 and the ground. Moreover, a capacitor C2 is connected between the collector of the transistor Q1 and the earth.

The transistor Q1 carries out switching operation in response to the driving pulse applied to the base thereof. During period of time when the transistor Q1 assumes its OFF state, a current flows through the resistor R2 to the capacitor C2 whereby the capacitor C2 is charged. While, during a period of time when the transistor Q1 assumes its ON state, the charges stored in the capacitor C2 are discharged through the transistor Q1. Accordingly, at a junction point between the collector of the transistor Q1 and the capacitor C2, is obtained a saw-tooth voltage indicated in FIG. 3(B).

In the known vertical deflection circuit, the saw-tooth voltage generated in the well-known saw-tooth voltage generation circuit as described above has been fed through the coupling capacitor to a vertical deflection coil. The average level of the saw-tooth voltage has been set so as to correspond to a center of the vertical deflection width, whereby the vertical deflection is carried out upward or downward with respect to the center thus set. Accordingly, when the vertical deflection is being carried out with an appropriate deflection width A1, as indicated in FIG. 1, there occurs no problem. However, the deflection width undergoes charge due to temperature fluctuation, as referred to above. For example, the vertical deflection is carried out over a width of A2, when the deflection width is smaller than the normal width A1, and over a width of A3, when the deflection width is larger than the normal width A1.

Accordingly, output signal of the camera tube of the television camera provided with the above described known circuit has a waveform indicated in FIG. 2(C) when the deflection width is A1, a waveform indicated in FIG. 2(D) for the deflection width A2, and a waveform indicated in FIG. 2(E) for the deflection width A3. In FIGS. 2(C), 2(D), and 2(E), reference numerals 17a, 17b, and 17c denote respectively the output black level signal parts obtained in responsive correspondence with the black part 13 of the optical filter 10, and reference numerals 18a, 18b, and 18c denote respectively the video signal parts obtained in responsive correspondence with the stripe filter 12. As apparent from each drawing, in response to variation of the deflection width, the video signal period width undergoes variation, and futhermore the position of the output black level signal fluctuates.

Accordingly, the clamp pulses 16 (FIG. 2(B)) for clamping the output black level signal thereby carrying out DC restoration of the black level are generated so as to be located at the positions on the time axis corresponding to the positions of the output black level signal 17a on the time axis. The signal 17a is obtained when the deflection width is the normal width A1.

Accordingly, the circuit known heretofore has been involved with difficulties that, while the output black level signal 17a at the normal position is clamped positively by the clamping pulse 16 thereby rendered DC restoration, the black level signals 17b and 17c which are present at positions deviated from the normal position of the signal 17a are not clamped normally, whereby the DC restoration is not carried out normally.

The circuit of the present invention has overcome the above described difficulties encountered in the above circuits. In a circuit of the present invention, the saw-tooth voltage generated as described hereinbefore is applied to the non-inverting input terminal of an operational amplifier 22. The resulting output voltage of the operational amplifier 22 is directly applied to one terminal a of a vertical deflection coil 23, without passing through any capacitor. The other terminal b of the vertical deflection coil 23 is connected to the inverting input terminal of the operational amplifier 22.

Here, the saw-tooth voltage which has been generated, as indicated in FIG. 3(B), in the saw-tooth voltage is now considered. In the above saw-tooth voltage, the voltage at points t1, t2, . . . of the termination of discharging (or at the initiating points of charging) is always constant, and the voltage (or the wave height value) at the charging termination undergoes fluctuation due to causes such a temperature fluctuation. Accordingly, it can be considered that the voltage at the points t1, t2, . . . of the saw-tooth voltage has been originally restored of DC.

According to the circuit of the present invention, when the deflection width fluctuation arises due to causes such a temperature fluctuation, the vertical deflection is carried out in a range of a width A4 for the deflection width smaller than the normal width A1, and in another range of a width A5 for the deflection width larger than the normal width A1. Specifically, even if the deflection width changes, the one end of the deflection width is kept to be held at the position corresponding to the black part 13 of the optical filter 10. The deflection width changes only accompanied with shift of the position of the other end of the deflection width.

Accordingly, output signals of the camera tube in the television camera provided with the circuit of the present invention have a waveform as indicated in FIG. 2(F) for the deflection width A1 (which waveform is the same as that in FIG. 2(C)), and a waveform as indicated in FIG. 2(G) for the deflection width A4, and a still another waveform as indicated in FIG. 2(H) for the deflection width A5. In FIGS. 2(F), 2(G), and 2(H), the reference numerals 17a denote the black level signal part obtained in responsive correspondence with the black part 13 of the optical filter 10, and reference numerals 18a, 18d, and 18e respectively denote the video signal parts obtained in responsive correspondence with the stripe filter 12.

As apparent from each drawing, whereas the video signal period width changes in response to fluctuation of the deflection width, the position of the black level signal 17a is always kept constant and is located at normal position corresponding to the clamping pulse 16.

Therefore, according to the circuit of the present invention, even if there arises fluctuation in the vertical deflection width, the black level of the output signal of the camera tube will be accurately clamped all the time, whereby the DC restoration is always carried out accurately.

Referring to FIG. 4, a reference DC voltage source 24 is connected through a resistor R3 to the terminal b of the vertical deflection coil 23. This reference DC voltage source 24 is adjusted and set so that a reference DC voltage thus adjusted is supplied to vertical deflection circuit 23, whereby the one end of the above described deflection width corresponds to the black part 13 of the optical filter 10.

Figure 5:
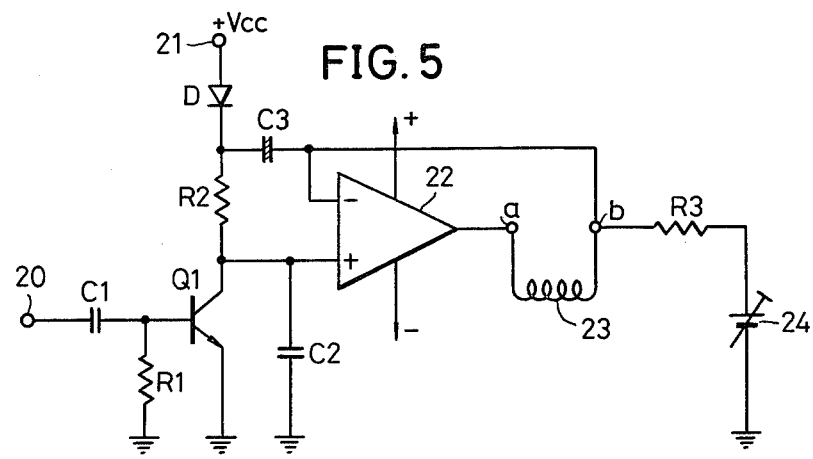
FIG. 5 is a circuit diagram showing another embodiment of a vertical deflection circuit according to the present invention.

FIG. 5 shows another embodiment of the vertical deflection circuit of the present invention. Parts in FIG. 5 which correspond to parts in FIG. 4 are designated by like reference numerals. Detailed description of such parts will not be repeated.

In general, the waveform of the saw-tooth voltage generated by the saw-tooth voltage generation circuit indicated in FIG. 4 is curved due to a charging and discharging characteristic of the capacitor, and has a poor linearity. The present embodiment is adapted to improve the linearity of the waveform of the saw-tooth voltage.

A diode D is connected and interposed between the power source terminal 21 and the resistor R2. A capacitor C3 is connected between a junction point of the diode D and the resistor R2, and the inversion input terminal of the operational amplifier 22 and the terminal b of the vertical deflection coil 23. The diode D and the capacitor C3 constitutes a bootstrap circuit.

By this bootstrap circuit, a curve of an inclined part of the waveform of the saw-tooth voltage (especially, a curved part at the top of the waveform indicated in FIG. 3(B)) is corrected to be linear, whereby linearity of the saw-tooth voltage waveform is improved.

Further, this invention is not limited to these embodiments but various variations and modifications may be made without departing from the scope of the invention.

What is claimed is:

1. A vertical deflection circuit of a camera tube in a color television camera in which said camera tube is provided with an optical filter having an optically black part extending in parallel with a beam scanning direction of the camera tube, said vertical deflection circuit comprising: a circuit for generating a saw-tooth voltage for vertical deflection; a vertical deflection coil for said camera tube; a circuit for supplying said saw-tooth voltage thus generated to one end of said vertical deflection coil in DC coupling; a reference voltage source for applying a reference voltage to the other end of said vertical deflection coil so that one end of a vertical deflection width corresponds to the black part of said optical filter; and a bootstrap circuit adapted to improve linearity of the waveform of said saw-tooth voltage.

2. A vertical deflection circuit of a camera tube in a color television camera in which said camera tube is provided with an optical filter having an optically black part extending in parallel with a beam scanning direction of the camera tube, said vertical deflection circuit comprising: a circuit for generating a saw-tooth voltage for vertical deflection, said saw-tooth voltage generation circuit comprising a transistor having a base applied with a vertical driving pulse, a resistor connected between a collector of said transistor and the voltage source, and a first capacitor connected between the collector of said transistor and a ground; a vertical deflection coil for said camera tube; an operational amplifier having a non-inverting input terminal applied with said generated saw-tooth voltage, an output terminal connected to one end of said vertical deflection coil in DC coupling, and an inverting input terminal connected to the other end of said vertical deflection coil; a reference voltage source connected to the other end of said vertical deflection coil and applying a reference voltage to said other end of said coil in a manner such that one end of a vertical deflection width corresponds to the black part of said optical filter; and a bootstrap circuit having a diode connected between said power source and said resistor, and a second capacitor having one electrode connected to a junction point of said resistor and said diode and the other electrode connected to the non-inverting input terminal of said operational amplifier and to the other end of said vertical deflection coil.

* * * * *